US012773980B2

(12) United States Patent
Sekiguchi

(10) Patent No.: US 12,773,980 B2
(45) Date of Patent: Oct. 27, 2026

(54) VEHICLE STATE DETECTION APPARATUS, VEHICLE, AND VEHICLE STATE DETECTION METHOD

(71) Applicant: Isuzu Motors Limited, Yokohama (JP)

(72) Inventor: Ryo Sekiguchi, Fujisawa (JP)

(73) Assignee: Isuzu Motors Limited, Kanagawa (JP)

( * ) Notice: Subject to any disclaimer, the term of this patent is extended or adjusted under 35 U.S.C. 154(b) by 0 days.

(21) Appl. No.: 18/947,334

(22) Filed: Nov. 14, 2024

(65) Prior Publication Data

US 2025/0187585 A1 Jun. 12, 2025

(30) Foreign Application Priority Data

Dec. 8, 2023 (JP) ................................ 2023-207752

(51) Int. Cl.

| | |
|---|---|
| ***B60W 20/50*** | (2016.01) |
| ***B60K 6/40*** | (2007.10) |
| ***B60W 10/06*** | (2006.01) |
| ***B60W 10/08*** | (2006.01) |
| ***G07C 5/10*** | (2006.01) |
| *G07C 5/08* | (2006.01) |

(52) U.S. Cl.

CPC ............... *B60W 20/50* (2013.01); *B60K 6/40* (2013.01); *B60W 10/06* (2013.01); *B60W 10/08* (2013.01); *G07C 5/10* (2013.01); *B60W 2710/0644* (2013.01); *B60W 2710/086* (2013.01); *B60Y 2200/92* (2013.01); *G07C 5/0816* (2013.01)

(58) Field of Classification Search

None

See application file for complete search history.

(56) References Cited

U.S. PATENT DOCUMENTS

2022/0145820 A1* 5/2022 Hotta .................... B60W 20/50
2022/0258725 A1 8/2022 Tagami et al.

FOREIGN PATENT DOCUMENTS

| | | | | |
|---|---|---|---|---|
| CN | 113074045 A | * | 7/2021 | .............. F02B 77/08 |
| JP | 2001065402 A | * | 3/2001 | |
| JP | 2009280082 A | | 12/2009 | |
| JP | 4967671 B2 | * | 7/2012 | |
| JP | 2022126136 A | | 8/2022 | |

OTHER PUBLICATIONS

Translation of JP-2001065402-A (Year: 2001).*
Japanese Office Action (and an English language translation thereof) dated Sep. 3, 2024, issued in counterpart Japanese Application No. 2023-207752.

* cited by examiner

*Primary Examiner* — Peter D Nolan
*Assistant Examiner* — Michael F Whalen
(74) *Attorney, Agent, or Firm* — Holtz, Holtz & Volek PC

(57) ABSTRACT

A vehicle state detection apparatus of a hybrid vehicle according to an embodiment includes an internal combustion engine and a first motor configured to generate power with the internal combustion engine, wherein a state of the internal combustion engine is detected based on a power-generation index indicating power being generated by the first motor.

6 Claims, 3 Drawing Sheets

VEHICLE STATE DETECTION APPARATUS, VEHICLE, AND VEHICLE STATE DETECTION METHOD

CROSS-REFERENCE TO RELATED APPLICATIONS

This application is based upon and claims the benefit of priority from Japanese Patent Application No. 2023-207752, filed Dec. 8, 2023, the entire contents of which are incorporated herein by reference.

FIELD

The present invention relates to a vehicle state detection apparatus, a vehicle, and a vehicle state detection method.

BACKGROUND

Hybrid vehicles (HEV), which use an internal combustion engine and a motor as a driving source, are known in the field of vehicles such as trucks (Jpn. Pat. Appln. KOKAI Publication No. 2009-280082). A technique for driving a power-generating motor with an internal combustion engine in such a hybrid vehicle and supplying a vehicle-driving motor for generating a driving force for the vehicle has been developed.

Such a vehicle includes, for example, an internal combustion engine, a first motor as a power generator, a second motor for driving the vehicle, a clutch disposed between the first motor and the second motor, and a battery. Driving of such a vehicle is controlled through switching of the connection state of the clutch in multiple different traveling modes, such as a traveling mode in which the second motor is used and a traveling mode in which the second motor and the internal combustion engine are used in combination.

SUMMARY

A vehicle state detection apparatus of a hybrid vehicle according to an embodiment comprises an internal combustion engine and a first motor configured to generate power with the internal combustion engine, wherein a state of the internal combustion engine is detected based on a power-generation index indicating power being generated by the first motor.

DETAILED DESCRIPTION

Figure 1:
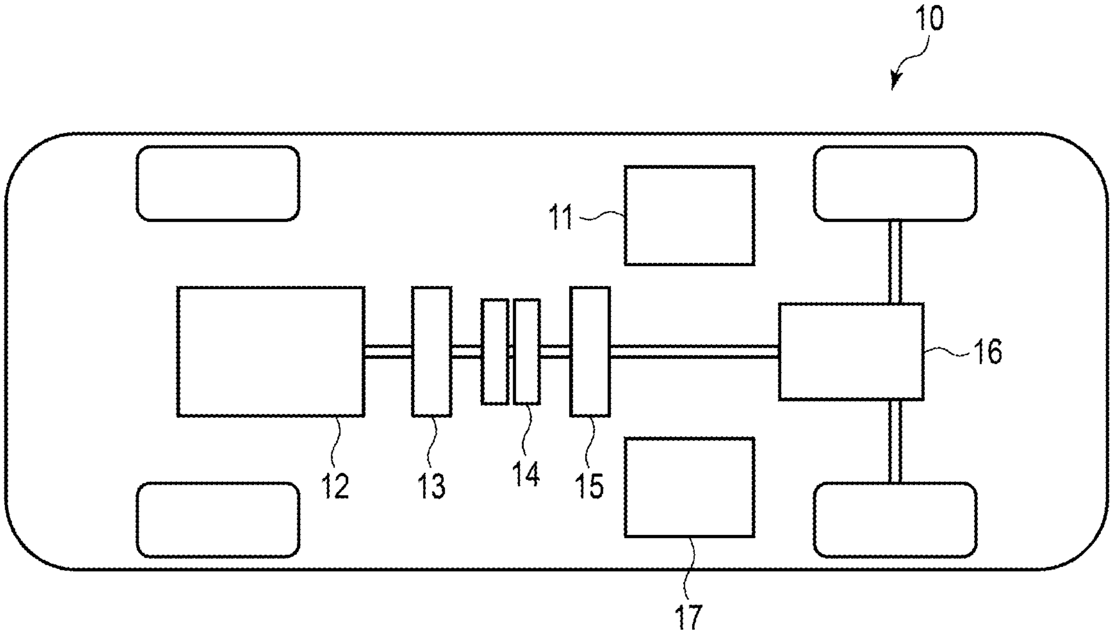
FIG. 1 is a block diagram showing a schematic configuration of a vehicle according to an embodiment of the present invention.
Figure 2:
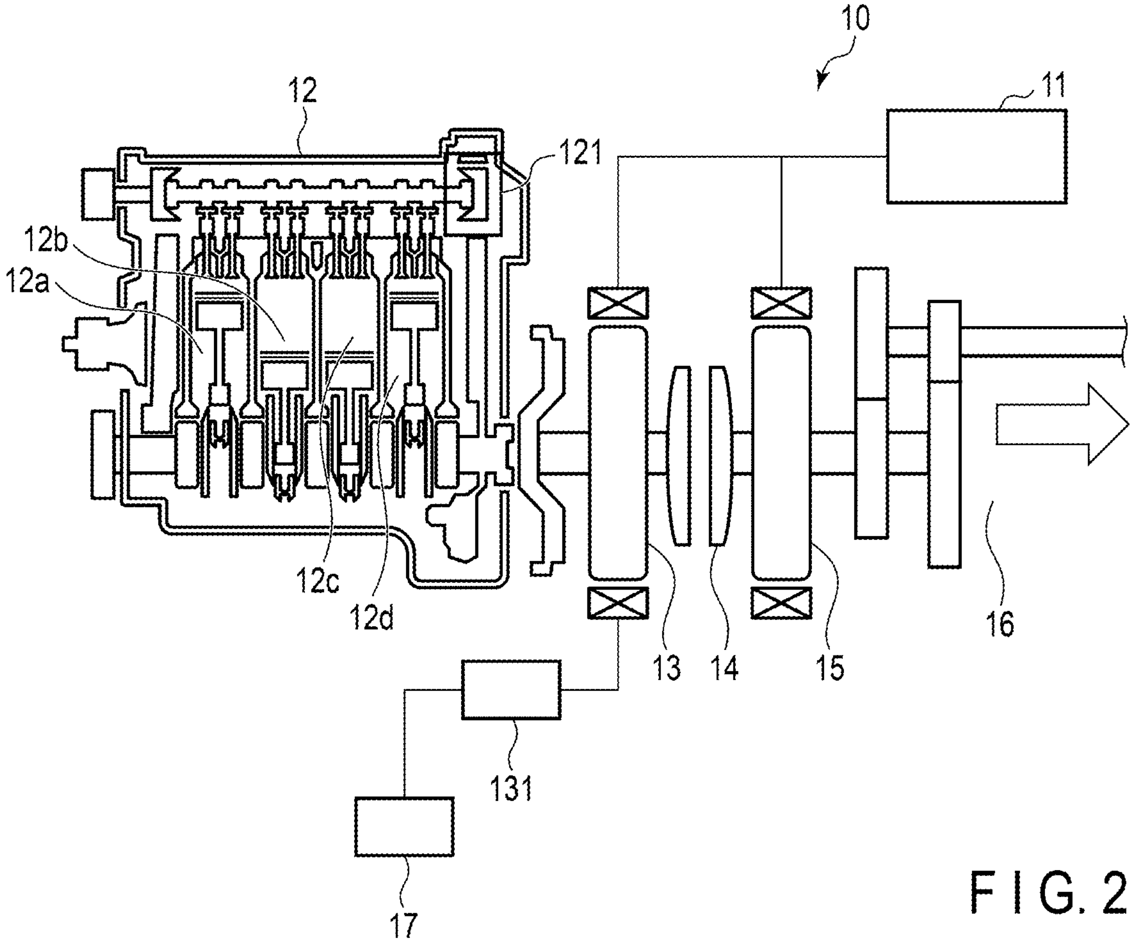
FIG. 2 is an explanatory diagram showing a schematic configuration of the vehicle according to the present embodiment.
Figure 3:
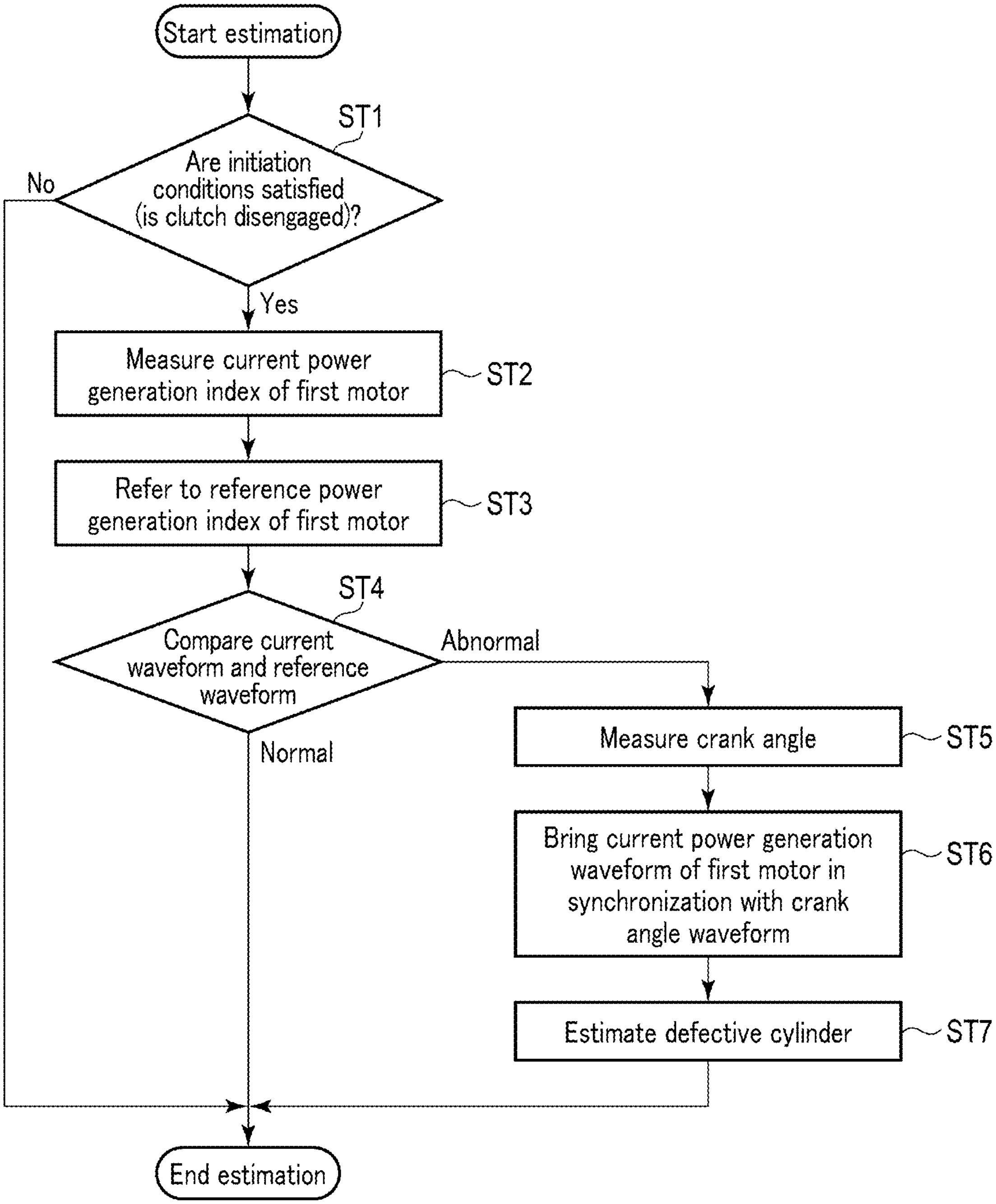
FIG. 3 is a flowchart of a vehicle state detection process according to the present embodiment.
Figure 4:
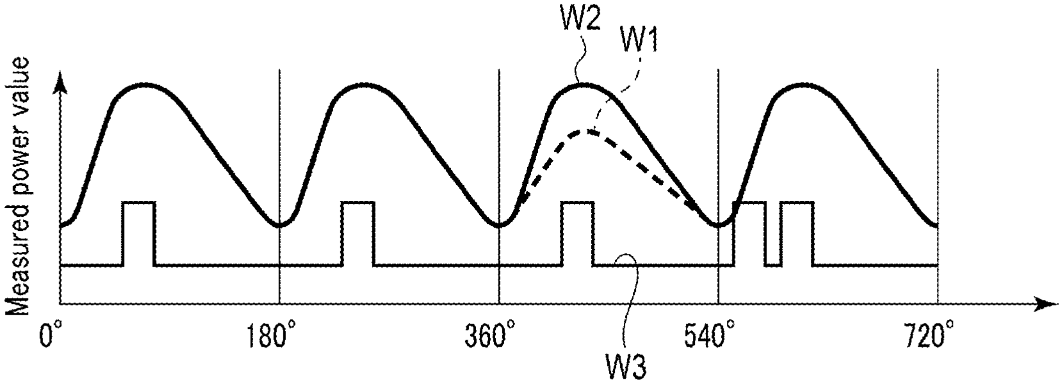
FIG. 4 is a waveform chart showing generated power and a crank angle according to the present embodiment.

Hereinafter, a vehicle 10 according to an embodiment of the present invention will be described with reference to FIGS. 1 to 4. FIG. 1 is a block diagram showing a configuration of the vehicle 10. FIG. 2 is an explanatory diagram showing a part of a configuration of the vehicle 10. FIG. 3 is a flowchart of a vehicle state detection process according to the present embodiment. FIG. 4 is a waveform chart showing generated power and a crank angle, in which power-generation waveforms and a crank angle waveform are brought in synchronization with each other and shown in an overlapping manner. For the sake of explanation, the configuration shown in each of the drawings is suitably enlarged, reduced, or omitted.

As shown in FIGS. 1 and 2, the vehicle 10 is a series-parallel hybrid vehicle (HEV) in which an internal combustion engine 12, a first motor 13, and a second motor 15 are installed as a driving source. The vehicle 10 is, for example, a truck.

The vehicle 10 includes a battery 11, an internal combustion engine 12, a first motor 13, a clutch 14 as a switching unit, a second motor 15, a traveling unit 16, and a control unit 17.

The battery 11 functions as a power source for the vehicle 10. The battery 11 is connected, via an inverter, to each of the first motor 13 and the second motor 15. Examples of the battery 11 that may be used include a lithium-ion battery, a solid lithium-ion battery, a graphene secondary battery, etc. The battery 11 includes, for example, a battery module including a plurality of battery cells.

The internal combustion engine 12 is an engine such as a diesel engine or a gasoline engine. The internal combustion engine 12 is a multicylinder engine including, for example, a plurality of cylinders **12*a* to 12*d*. Each of the cylinders 12*a* to 12*d* includes a fuel injection valve, and is connected to a fuel tank. The internal combustion engine 12 operates by being supplied with a fuel from the fuel tank, and thereby generates a kinetic force (a torque) to be a driving force. Opening/closing of fuel injection valves of the cylinders 12*a* to 12*d* of the internal combustion engine 12, the amount and timing of fuel supply, etc. are configured to be controlled by the control unit 17**.

The internal combustion engine 12 is connected to the traveling unit 16 via the clutch 14, and is configured to drive the traveling unit 16. The internal combustion engine 12 is connected to the first motor 13, and is configured to drive the first motor 13 to generate power.

In the internal combustion engine 12, a crank angle sensor 121 configured to measure a crank angle of the internal combustion engine 12 is provided. The crank angle sensor 121 detects a reference position, an angle of rotation, and a rotation number of the crankshaft of the internal combustion engine 12, and outputs a pulse as a crank angle signal for each predetermined crank angle. As the crank angle sensor 121, an optical or electromagnetic sensor, for example, is used. The crank angle waveform W3 measured by the crank angle sensor 121 is, for example, a waveform that has pulses at every 180°, as shown in FIG. 4. For example, the crank angle waveform W3 has a single pulse in a crank angle range corresponding to each of the three cylinders **12*a* to 12*c*, and has two pulses in a crank angle range corresponding to the last (fourth) cylinder 12*d***.

The first motor 13 includes, for example, a motor case, a stator fixed to the motor case, and a rotor fixed to a shaft supported by the motor case. The first motor 13 is, for example, connected to the battery 11 via an inverter.

A main shaft of the first motor 13 is connected to the internal combustion engine 12. The first motor 13 is configured to generate power from the kinetic force of the internal combustion engine 12. That is, the first motor 13 functions as a power generator through an input of a rotational force from the internal combustion engine 12 to the main shaft. Also, the first motor 13 charges the battery 11 through power generated by absorbing the torque of the internal combustion engine 12.

The first motor 13 may function as a driving motor that drives the traveling unit 16 through being supplied with power from the battery 11. Furthermore, the first motor 13 may function as a starter that starts the internal combustion engine 12. That is, the first motor 13 may function as either a driving source, a power generator, or a starter of the vehicle 10 according to the operation state.

In the first motor 13, a power measuring device 131 is provided.

The power measuring device 131 detects, for example, variations in current value, voltage value, power value, and torque as a power-generation index indicating power being generated by the first motor 13. The power measuring device 131 includes, for example, various types of measuring devices and sensors, such as an ammeter for measuring a current value, a voltmeter for measuring a voltage value, a power sensor for measuring a power value, and a torque sensor for detecting a torque applied to a shaft such as a drive shaft and a propeller shaft.

An inverter is provided between the battery 11 and the first motor 13 and between the battery 11 and the second motor 15, and includes a power element, a capacitor, control circuitry, etc. The inverter converts a direct-current voltage from the battery 11 into an alternating-current voltage, and supplies a three-phase current to the motors 13 and 15. The inverter converts the alternating-current voltage generated by the first motor 13 into a direct-current voltage.

The clutch 14 is, for example, a dry friction clutch provided on an output side of the internal combustion engine 12. The clutch 14 is configured to disconnect a kinetic force transmission path leading from the internal combustion engine 12 to the traveling unit 16 under the control of the control unit 17.

The second motor 15 includes a motor case, a stator fixed to the motor case, and a rotor fixed to a shaft supported by the motor case. The second motor 15 is connected to the traveling unit 16. The second motor 15 is connected to the battery 11 via an inverter. The second motor 15 functions as a driving motor that rotates the shaft of the traveling unit 16 through being supplied with power from the battery 11. That is, the second motor 15 functions as a driving source of the vehicle 10.

The traveling unit 16 includes a driveshaft, an automatic transmission, a kinetic force transmitter, front wheels, rear wheels, etc. For example, an automatic transmission is disconnectably connected to an output shaft of the internal combustion engine 12 via the clutch 14, and right and left front wheels and rear wheels, which are driving wheels, are connected to an output shaft of the automatic transmission via a kinetic force transmitter including a propeller shaft, a differential, a transfer case, etc. The traveling unit 16 changes, with the automatic transmission, the speed of a kinetic force obtained by rotation of the internal combustion engine 12 transmitted via the clutch 14 at a predetermined velocity ratio, and transmits the changed power to the front and rear wheels via the kinetic force transmitter.

The control unit 17 is a device, such as a computer, configured to perform arithmetic operations, and includes various processing circuits such as input/output devices, storage devices (a ROM, a RAM, a non-volatile RAM, etc.), a central processing unit (CPU), etc. The control unit 17 functions as a traveling control apparatus or a vehicle state detection apparatus (a fault diagnosis apparatus) through execution of various programs. The control unit 17 may be provided in the vehicle 10, or may be partly or entirely provided in a separate external terminal. The control unit 17, which is to be a vehicle state detection apparatus, may be, for example, a part of an engine control unit (ECU) configured to control the internal combustion engine 12. The control unit 17, which is a vehicle state detection apparatus (vehicle state detection unit), may be provided in a terminal separate from the vehicle 10.

The crank angle sensor 121, the power measuring device 131, and other various sensors are connected to the control unit 17, and detection and operating information from such components is input to the control unit 17. Also, the control unit 17 is connected to the internal combustion engine 12, the first motor 13, the clutch 14, and the second motor 15, and controls the operation of each of these components.

For example, the control unit 17 controls driving of the vehicle 10 based on operating information such as throttle operation information and various detection values of the vehicle 10. That is, the control unit 17 transmits a control signal to each component, and performs various control processes necessary for driving, such as output control of the motors 13 and 15, power generation amount control of the first motor 13, switching control of the clutch 14, and operation control of the internal combustion engine 12. The control unit 17 controls a torque and a rotation number of the internal combustion engine 12 by, for example, controlling a fuel injection amount of the internal combustion engine 12. Also, the control unit 17 controls disengagement of the clutch 14, thereby switching the connection state of the driving source and switching the traveling mode. The control unit 17 controls the outputs of the motors 13 and 15.

The control unit 17 drives the vehicle 10 according to the driving state in multiple different traveling modes in which, for example, multiple driving sources, namely, the first motor 13, the second motor 15, and the internal combustion engine 12 are suitably combined. The control unit 17 controls the vehicle 10 by, for example, switching, according to the driving state, between multiple different traveling modes, such as a traveling mode in which both the first motor 13 and the second motor 15 are used as the driving source, a traveling mode in which one or both of the first motor 13 and the second motor 15 and the internal combustion engine 12 are used as the driving source, and a traveling mode in which only the internal combustion engine 12 is used as the driving source, as well as a first traveling mode in which the second motor 15 is used as the driving source.

Hereinafter, a vehicle state detection method (a fault diagnosis method) according to the present embodiment will be described with reference to FIG. 3. The vehicle state detection method according to the present embodiment includes: acquiring a power-generation index indicating power being generated by the first motor 13; and detecting a state of the internal combustion engine 12 by comparing a progression of the acquired current power-generation index and a progression of a reference power-generation index.

In the present embodiment, an example is shown in which a fault diagnosis process is performed to detect a presence or absence of an abnormality in a state of the internal combustion engine 12 in the case of, for example, a first traveling mode in which, as an example, the second motor 15 is driven with power supplied from the battery 11 and the traveling unit 16 is driven to allow the vehicle 10 to travel. For example, in the first traveling mode, the clutch 14 is disengaged, and a driving force necessary for traveling is output from the second motor 15. That is, the vehicle 10 is allowed to travel by driving the second motor 15 with power supplied from the battery 11 and driving the traveling unit 16.

The control unit 17 determines, at ST1, whether or not initiation conditions for the fault diagnosis process are satisfied. In the present embodiment, it is determined, for example, that the initiation conditions are satisfied if, for example, the clutch 14 of the first motor 13 is disengaged, and the vehicle 10 is traveling in EV mode with the second motor 15. If the control unit 17 determines that the initiation conditions are satisfied (Yes at ST1), the processing advances to ST2. If the control unit 17 determines that the initiation conditions are not satisfied (No at ST1), the estimation processing is terminated.

At ST2, the control unit 17 operates the internal combustion engine 12 at a predetermined rotation number, generates power by absorbing a torque with the first motor 13, and measures the generated power. The control unit 17 acquires a progression of a power-generation index indicating power being generated by the first motor 13. The progression is, for example, a progression over time. At this time, the rotation speed of the internal combustion engine 12 is set to be constant, the generated power is supplied to the battery 11, and the battery 11 is charged. At ST2, the control unit 17 acquires a measured power-generation waveform W1, which is a progression of a power-generation index including at least one of a current, a voltage, power, and a torque as information related to the generated power, using a measuring device or various sensors attached to the first motor 13, an interconnect system, etc. The measured power-generation waveform W1 represents, for example, a voltage value, a current value, a power value, or a torque value as a function of time on the horizontal axis, and exhibits a shape of a wave that is repeated at predetermined cycles, as shown for example in FIG. 4. The control unit 17 is capable of, for example, confirming variations in torque in a steady state by detecting an output torque in the case where the engine is run with the rotation number kept constant. The processing advances to ST3.

At ST3, the control unit 17 acquires a reference power-generation waveform W2. It is assumed that the reference power-generation waveform W2 represents a progression of a power-generation index of the first motor 13 that has been measured in the past. The progression is, for example, a progression over time. The reference power-generation waveform W2 represents a progression of a power-generation index measured in a state in which the internal combustion engine 12 is normal at the time of shipping or at a predetermined timing prior to ST2. It is assumed that data representing the reference power-generation waveform W2 is stored in a storage device of the control unit 17. The processing advances to ST4.

At ST4, the control unit 17 compares the measured power-generation waveform W1 with the reference power-generation waveform W2, and determines a presence or absence of an abnormality in the internal combustion engine 12.

In FIG. 4, the measured power-generation waveform W1, which represents a progression of power (a current×a voltage) obtained as a detection result of the power measuring device 131, is expressed by the dashed line, and the reference power-generation waveform W2, which represents a progression of power (a current×a voltage) measured in the past by the power measuring device 131, is expressed by the solid line. A crank angle waveform W3 shown in FIG. 4 is brought in synchronization with the measured power-generation waveform W1 and the reference power-generation waveform W2. In the present embodiment, the internal combustion engine 12 is a four-cylinder engine, and both of the measured power-generation waveform W1 and the reference power-generation waveform W2 have, for example, a mountain-shaped pulse that is repeated every 180°.

It can be seen from FIG. 4 that the measured power-generation waveform W1 changes at the portion of the third pulse in terms of the shape and the numerical value. At the other portions, the measured power-generation waveform W1 shown in FIG. 4 overlaps and exhibits the same shape as the reference power-generation waveform W2 shown by the solid line. The control unit 17 determines, for example, that the internal combustion engine 12 is abnormal if a difference in shape or numerical value between the measured power-generation waveform W1 and the reference power-generation waveform W2 is equal to or greater than a predetermined value or falls within or above a predetermined range (ST4: Yes). On the other hand, the control unit 17 determines that the internal combustion engine 12 is normal if the difference in shape or numerical value between the measured power-generation waveform W1 and the reference power-generation waveform W2 is less than the predetermined value or falls below the predetermined range (ST4: No), and terminates the estimation process. At this time, the determination may be performed using a maximum value of the difference between the numerical values of the two waveforms W1 and W2, or may be performed based on an average value. Alternatively, the determination may be performed based on a difference in the shape of the waveform, including a deviation and a slope.

At ST5, the control unit 17 detects a crank angle. At ST6, the control unit 17 brings the measured power-generation waveform W1 of the first motor 13 and the crank angle waveform W3 in synchronization with each other. At ST7, the control unit 17 identifies a defective cylinder based on the crank angle waveform W3 that overlaps a measured power-generation waveform W1 determined to be abnormal at ST4.

In the measured power-generation waveform W1 shown in FIG. 4, for example, it can be seen that the portion having a shape different from that of the reference power-generation waveform W2 corresponds to a time period in which the crank angle is from 360° to 540°. Accordingly, by identifying a crank angle corresponding to the portion that exhibits an abnormal value, it is possible to identify a cylinder that exhibits an abnormal value.

The control unit 17 may be configured, if the internal combustion engine 12 is determined to be abnormal at ST4, to perform a notification process to prompt the user to perform maintenance, or to perform a fault-response operation of restricting the operation of the internal combustion engine 12 to restrict use of the vehicle 10.

According to the vehicle 10 of the present embodiment, by comparing the characteristics of the power generated by the first motor 13 with the characteristics of the power generated in the past, it is possible to estimate a defect that has occurred in a combustion chamber of the internal combustion engine 12. It is thereby possible to easily detect a defect in the internal combustion engine 12 using a measuring device or a sensor that is commonly equipped in the vehicle 10. Also, by bringing the waveform of the power-generation index in synchronization with the crank angle waveform measured by the crank angle sensor 121 of the internal combustion engine 12, it is possible to estimate a defective cylinder. According to the present embodiment, it is possible to detect an index of power that is generated in the case where the clutch 14 is disengaged and the rotation number of the engine is kept constant, and to check, for example, a variation in torque as a variation in power-generation index in the case where the engine is run in a steady state. It is thereby possible to detect a torque with only an engine, thus improving the precision in fault diagnosis.

The present invention is not limited to the above-described embodiment.

For example, various sensors and measuring devices that function as a detection unit configured to measure an index of generated power may be directly installed on the first motor 13, or provided in a wiring system such as a high-voltage conductor.

Moreover, the traveling mode of the vehicle 10 is not limited to the one exemplified in the above-described embodiment, and may be either in series or parallel. For example, the vehicle 10 may be a type that supplies electricity obtained by a regenerative brake to the battery 11.

In the above-described embodiment, a case where the clutch 14 is disengaged and the vehicle 10 is traveling in EV mode with the second motor 15 has been described as an example of initiation conditions; however, the configuration is not limited thereto. For example, the detection timing may be periodic or set to a suitable timing such as the time of operation of the internal combustion engine 12. For example, a fault diagnosis process may be performed not only during traveling but also during stopping or measuring. Accordingly, if the driving force of the driving wheels of the traveling unit 16 can be correctly detected as needed, data can be synchronized in real time, and variations in torque can be recorded under various operating conditions, it is possible to perform fault diagnosis even with the clutch connected.

The operation after the fault diagnosis is not limited to the above-described notification process. For example, in addition to or in place of a notification process after the fault diagnosis, the internal combustion engine 12 may be stopped or may be driven up to a predetermined output and then stopped, and the operation of the internal combustion engine 12 may be restricted by suppressing the fuel injection amount. Moreover, the criterion for determination is not limited to a numerical value or range indicative of a fault. For example, a threshold may be set in multiple stages, and prediction diagnosis may be performed using a numerical value or range indicative of a possible fault as a criterion for determination, prompting the user to perform maintenance.

In addition, the reference power-generation index, which has been described as past data, may be data acquired at the time of operation of the internal combustion engine 12 at a timing immediately therebefore, or the reference power-generation index may be acquired by operating the engine alone at the time of shipping.

The connection state of the vehicle 10 has been described as being switched by the clutch 14; however, the configuration is not limited thereto.

In the above-described embodiment, an example has been described in which a single internal combustion engine 12, a single first motor 13, and a single second motor 15 are provided; however, the configuration is not limited thereto, and the vehicle 10 may be driven by multiple systems. As the driving system, various driving systems, such as front-wheel driving, rear-wheel driving, or four-wheel driving may be applied.

In the above-described embodiment, an example has been described in which the control unit 17, which is a vehicle state detection apparatus, is mounted on the vehicle 10; however, the configuration is not limited thereto. The control unit 17 may be configured as, for example, a terminal that can be externally attached to the vehicle 10, or may be provided in an external terminal. Moreover, data such as a power-generation index that had been detected in the vehicle 10, for example, may be transmitted to a terminal other than the vehicle 10 via wired or wireless communications, and a determination process may be performed from an external terminal at the time of maintenance, etc. A determination process may be performed by, for example, an external terminal using an app, etc. of a smartphone or the like.

An embodiment according to the present invention has been described; however, the present invention is not limited to the above-described embodiment, and may be suitably varied or modified. The accompanying claims and their equivalents are intended to cover such forms or modifications as would fall within the scope and spirit of the inventions.

What is claimed is:

1. A hybrid vehicle, comprising:

an internal combustion engine;

a first motor connected to the internal combustion engine;

a battery connected to the first motor;

a second motor connected to the battery;

a traveling unit;

a switching device configured to switch a state of connection between the first motor and the traveling unit; and a controller operably coupled to the first motor, the controller comprising at least one processing circuit configured to execute processes comprising:

operating the internal combustion engine;

detecting, based on output from a measuring device attached to the first motor, a power-generation index indicating power being generated by the first motor during operation thereof;

determining a state of the internal combustion engine based on a current power-generation index detected in the detecting; and in response to determining in the determining that the connection between the first motor and the traveling unit is broken, operating the internal combustion engine at a predetermined rotation number, generating power with the first motor, and detecting the current power-generation index.

2. The hybrid vehicle according to claim 1, wherein the detecting the state of the internal combustion engine comprises detecting a defect in the internal combustion engine based on a progression over time of the current power-generation index and a progression over time of a reference power-generation index.

3. The hybrid vehicle according to claim 1, wherein the switching device includes a clutch.

4. The hybrid vehicle according to claim 2, wherein the processes further comprise performing a notification process or to restricting an operation of the internal combustion engine based on the current power-generation index and the reference power-generation index.

5. The hybrid vehicle according to claim 4, wherein the processes further comprise detecting information on an abnormal cylinder based on a waveform of the current power-generation index and a waveform of a crank angle of the internal combustion engine.

6. A method of controlling a hybrid vehicle, the hybrid vehicle including an internal combustion engine, a first motor connected to the internal combustion engine, a battery connected to the first motor, a second motor connected to the battery, a traveling unit, a switching device configured to switch a state of connection between the first motor and the traveling unit, and a controller operably coupled to the first motor and comprising at least one processing circuit, and the method comprising, under control of the at least one processing circuit:

operating the internal combustion engine;

detecting, based on output from a measuring device attached to the first motor, a power-generation index indicating power being generated by the first motor during operation thereof;

determining a state of the internal combustion engine based on a current power-generation index detected in the detecting; and in response to determining in the determining that the connection between the first motor and the traveling unit is broken, operating the internal combustion engine at a predetermined rotation number, generating power with the first motor, and detecting the current power-generation index.

* * * * *